United States Patent
Yago et al.

(10) Patent No.: US 8,078,863 B2
(45) Date of Patent: Dec. 13, 2011

(54) INFORMATION PROCESSING APPARATUS AND PROGRAM

(75) Inventors: Hiroaki Yago, Hachioji (JP); Tomohiro Suzuki, Nishitokyo (JP); Tetsuya Ishikawa, Hachioji (JP); Tomoya Ogawa, Hachioji (JP); Fumikage Uchida, Asaka (JP); Munetoshi Eguchi, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 638 days.

(21) Appl. No.: 12/188,105

(22) Filed: Aug. 7, 2008

(65) Prior Publication Data

US 2009/0150661 A1  Jun. 11, 2009

(30) Foreign Application Priority Data

Sep. 12, 2007 (JP) ................................. 2007-236316

(51) Int. Cl.
*G06F 7/04* (2006.01)
*G06F 9/00* (2006.01)

(52) U.S. Cl. .................... 713/2; 713/1; 713/100; 726/2; 726/16; 726/17; 726/21; 726/26

(58) Field of Classification Search .................. 713/1, 2, 713/100; 726/2, 16, 17, 21, 26
See application file for complete search history.

(56) References Cited

U.S. PATENT DOCUMENTS

| | | | |
|---|---|---|---|
| 6,513,113 B1 * | 1/2003 | Kobayashi | 713/2 |
| 7,464,259 B2 * | 12/2008 | Sukegawa et al. | 713/2 |
| 2007/0061559 A1 * | 3/2007 | Kwon et al. | 713/1 |

* cited by examiner

*Primary Examiner* — M Elamin
(74) *Attorney, Agent, or Firm* — Squire, Sanders & Dempsey (US) LLP

(57) ABSTRACT

An information processing apparatus including: a first recording medium which stores a first program; a connection section which is capable of connecting to a second recording medium outside of the information processing apparatus; an instruction input section to input, while the information processing apparatus is in an activated state, an instruction for booting a second program stored in the second recording medium that is connected to the connection section on booting of the BIOS; and a controller which, performs a check when booting of a BIOS, if the second recording medium is connected and the instruction has been input while the information processing apparatus is in an activated state; in case when the second recording medium is connected and the instruction has been input is confirmed, the control section boots the second program; and in case when it is not confirmed, the control section boots the first program.

11 Claims, 3 Drawing Sheets

INFORMATION PROCESSING APPARATUS AND PROGRAM

RELATED APPLICATION

The present application is based on Patent Application No. 2007-236316 filed at the Japan Patent Office on Sep. 12, 2007 and which is hereby incorporated herein in its entirety.

TECHNICAL FIELD

The present invention relates to an information processing apparatus and program including functions for performing program boot control on BIOS (Basic Input/Output System) booting.

BACKGROUND

In information processing apparatus (computer systems) such as personal computers and the like, boot drive assignment is determined by the BIOS setting (BIOS setup menu) and booting is done from the drive that is assigned the highest priority level. Normally, an external recording medium (external device) is assigned the highest priority and when the external recording medium is connected to the apparatus and the power is turned on, booting is done from the external recording medium. In addition, when the power is turned on without the external recording medium being connected to the apparatus, booting is done from an internal device such as the HDD (Hard Disk Drive) which has been assigned the next priority level and the programs stored in the internal device are booted and the apparatus can be used in the normal operation mode (for example Japanese Unexamined Patent Application Publication No. 2002-215399).

In the foregoing information processing apparatus, after booting from the external recording medium, if the user forgets to disconnect the external recording medium from the apparatus and turns on the power, booting from the external recording medium occurs again, the apparatus cannot be used in normal operation mode in the case where the user wishes to use the apparatus in normal operation mode. Also when the apparatus returns from the energy saving mode, booting from the external recording medium occurs and use in the normal operation mode is no longer possible. It is not desirable that in this manner, the external recording medium that the user forgot to disconnect from the apparatus is detected and booting from the external recording medium is performed, and contrary to the will of the user, use of the apparatus in the normal operation mode is no longer possible.

It is required to provide the information processing apparatus and program, even in the case where the user forgets to detach the recording medium that is externally connected to the apparatus, booting from the recording medium that is against the will of the user can be prevented.

SUMMARY

One aspect of the present invention is an information processing apparatus including:

An information processing apparatus comprising:
a first recording medium which stores a first program;
a connection section which is capable of connecting to a second recording medium outside of the information processing apparatus;
an instruction input section to input, while the information processing apparatus is in an activated state, an instruction for booting a second program stored in the second recording medium that is connected to the connection section on booting of the BIOS; and
a controller which, performs a check when booting of a BIOS, if the second recording medium is connected to the connection section and the instruction has been input from the instruction input section while the information processing apparatus is in an activated state; in case when a state that the second recording medium is connected to the connection section and the instruction has been input from the instruction input section is confirmed when booting of a BIOS, the control section boots the second program; and in case when the state is not confirmed when booting of a BIOS, the control section boots the first program.

And another aspect of the present invention is a computer readable recording medium:

A computer readable recording medium storing a program which causes an information processing apparatus,
to check, when booting of a BIOS, if a connection section which is capable of connecting to a second recording medium outside of the information processing apparatus is connected to the second recording medium and an instruction for booting a second program stored in the second recording medium that is connected with the connection section on booting of the information processing apparatus is input from the instruction input section from which the instruction has been input in an activated state of the information processing apparatus;
to boot the second program in case when a state that the connection section is connected with the second recording medium and the instruction has been input is confirmed; and
to boot a first program stored in the first recording medium in case when the state cannot be confirmed.

DESCRIPTION OF THE PREFERRED EMBODIMENT

The following is a description of an embodiment of the present invention based on the drawings.

Figure 1:
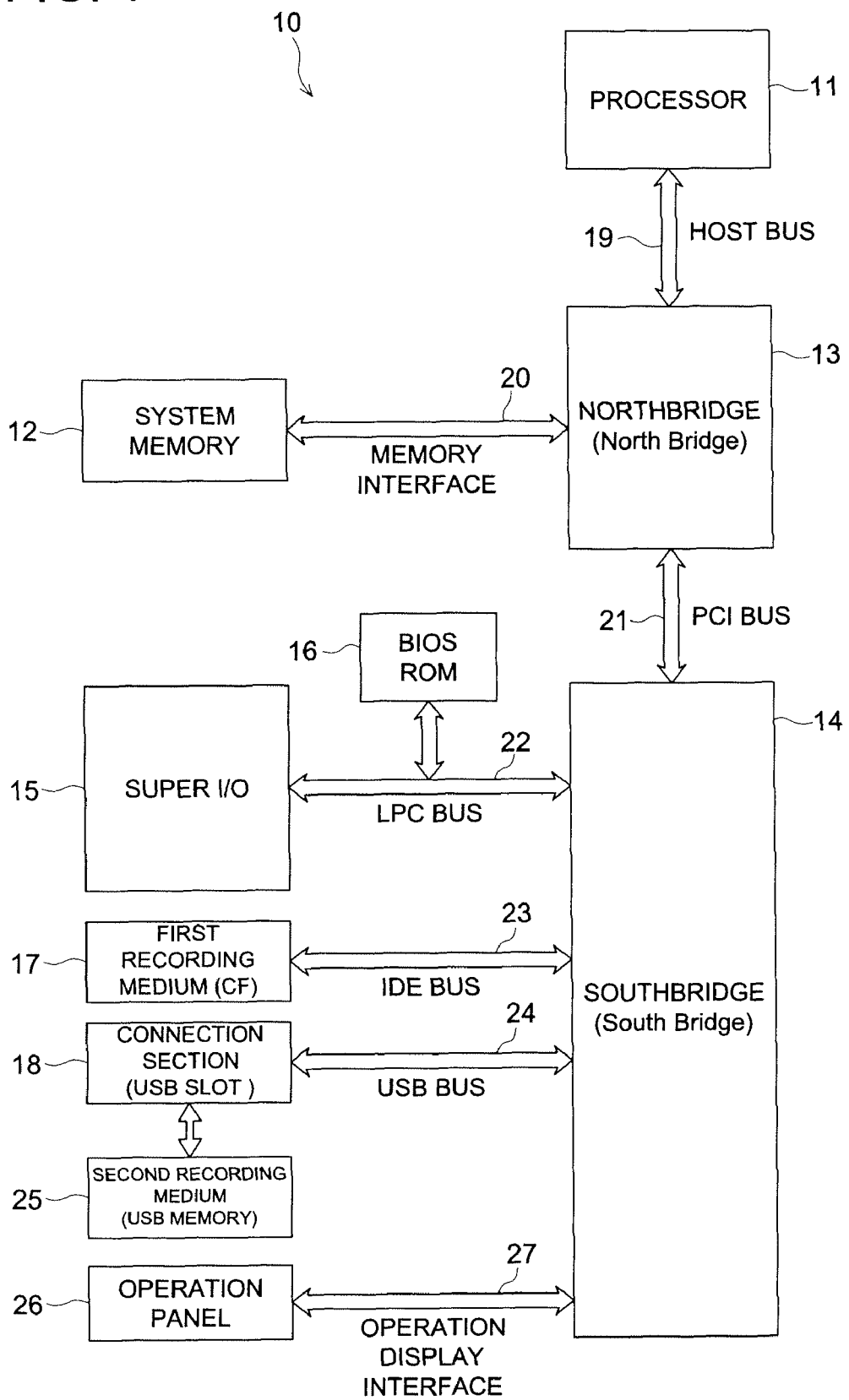
FIG. 1 is a control block diagram showing the main components of the information processing apparatus of an embodiment of the present invention.

FIG. 1 shows the main components of the information processing apparatus 10 of an embodiment of the present invention. The information processing apparatus 10 is a digital multifunction peripheral which includes a copy function which reads a document and forms a corresponding image on recording paper and outputs; scanner function; printer function; facsimile function and the like. As shown in FIG. 1, the information processing apparatus 10 comprises: a processor 11; a system memory 12; a north bridge 13; a south bridge 14; a super I/O (super input/output) 15 and a BIOSROM (Basic Input/Output System Read Only Memory) 16; a first recording medium 17; and a connection section 18 to which the second recording medium 25 is connected; and an operation panel 26. That is to say, the information processing apparatus 10 includes a computer system for performing all of these functions.

The processor 11 has a calculating function and is connected to the north bridge 13 via the host bus 19.

The system memory 12 is a volatile memory used for: storage of the programs performed by the processor 11; for work memory when the processor 11 executes programs; and for storage of image data and is connected to the north bridge 13 via the memory interface 20.

The north bridge 13 includes a host-PCI bridge that connects the host bus 19 and the PCI (Peripheral Component Interconnect) bus 21; a memory controller which controls access to the system memory 12; a cache controller which controls access to the cache memory (not shown); and the like.

The south bridge 14 is connected to the north bridge 13 via the PCI bus 21 and comprises: PCI-LPC (Low Pin Count) bridge which connects the PCI bus 21 and LPC bus 22; a PCI-IDE (Integrated Drive Electronics) bridge which connects the PCI bus 21 and the IDE bus 23; a PCI-USB (Universal Serial Bus) bridge which connects the PCI bus 21 and the USB; an operation panel controller which controls the operation panel 26; an interruption controller which judges the interrupt request from the peripheral devices in their priority order and transmits them to the processor 11 and generates interrupt request signal.

The super I/O 15 comprises basic I/O such as a mouse controller; a keyboard controller; a flexible disk cartridge drive controller; a serial/parallel port, and is connected to the south bridge 14 via the LPC bus 22.

BIOSROM 16 is a ROM (Read Only Memory) which stores BIOS which are programs that control the peripheral devices such as the disk drive, the keyboard, the video card (not shown) which are connected to the information processing apparatus 10, is for example, a rewriteable EPROM (Erasable Programmable Read Only Memory). BIOS provides for the OS (Operating System) or the various programs (application software) for basic input means corresponding to the peripheral devices connected to the information processing apparatus 10.

The BIOS settings include date and time setting, setting of peripheral devices such as disk drives and devices, video cards and the like, and setting of priority level for boot drives (boot devices). The priority level setting of the boot drive is such that in the initial state, the second recording medium 25 has priority level 1 and the first recording medium 17 has priority level 2. However, after the information processing apparatus 10 boots up, input of prescribed instruction from the operation panel 26 described hereinafter becomes the booting condition for the second recording medium 25. In addition, in order to ensure the security of the information processing apparatus 10, the BIOS setup menu is not open to general users, but rather a specific ID or password must be entered and only when authentication of the person is confirmed, the menu is opened and menu screens and the like are displayed.

The first recording medium 17 is a Compact Flash (CF, Registered Trademark) which is one type of rewritable flash memory and is loaded inside the information processing apparatus 10 via the connection section which is not shown and cannot be removed at all or cannot be easily removed, and it is connected to the south bridge 14 via the IDE bus 23 via this connection section. In addition, the OS which controls the operation of the information processing apparatus 10 and the first program which operates on this OS are stored on the first recording medium 17.

The connection section 18 comprises a USB slot and is connected to the south bridge 14 via the USB bus 24.

The second recording medium 25 comprises USB memory (external device) and connects to and is removable from the connection section 18 outside of the information processing apparatus 10. Specific cancel key files that store specific cancel keys (authentication information), OS, and the second program are stored in this second recording medium 25.

The specific cancel key may be a user setting or a device specific password/authentication code, and for example "xyz20060925" may be suitably selected and set. In addition, the second program that is stored in the second recording medium 25 may for example, include commercially available diagnostic tools and log collection program for the information processing apparatus 10; program for automatically updating of programs stored in the first recording medium 17; and programs that provide customized functions for OEM (Original Equipment Manufacturer) and for each user (for example customizing such that only the required input and output modes are displayed), and they operate on the OS stored on the second recording medium 25.

The operation panel 26 comprises a liquid crystal display that has a touch panel on its surface and various information and status displays are provided for the user. The operation panel 26 functions as an operation display section (instruction input section), in which various operations by the user are received. The operation panel 26 is connected to the south bridge 14 via the operation display interface 27.

Next, booting operation (booting processing) for the information processing apparatus 10 having the configuration described above will be described.

First, terminology (initial boot, reboot (A/B), device manager setting mode) used in the following description will be defined.

Booting operation of the information processing apparatus 10 includes initial boot and reboot (A/B).

"Initial boot" refers to the process by which the apparatus transfers from the power off state to power on state and is booting for performing normal operation.

"Reboot A" refers to rebooting in the case where the user (manager customer, service provider etc.) operates the operation panel 26 and external boot is performed based on instruction from the user without the power going off.

"Reboot B" refers to rebooting in the case of transfer to the energy saving mode after a prescribed time has elapsed after normal operation is complete, and then the device is returned to normal operation mode when the energy saving mode is cancelled.

In rebooting the information processing apparatus 10, in the case of reboot A only, authentication of external devices (second recording medium 25) is performed during BIOS booting and a determination is made as to whether the boot device is to be automatically switched or not.

The modes of the information processing apparatus 10 at the time of operation include normal operation mode which is an activated state of the information processing apparatus 10 and energy saving mode as well as device manager setting mode.

The "device manager setting mode" is the mode in which the manager password can be input during normal operation. Device status settings and reboot A can be performed in this mode.

Figure 2:
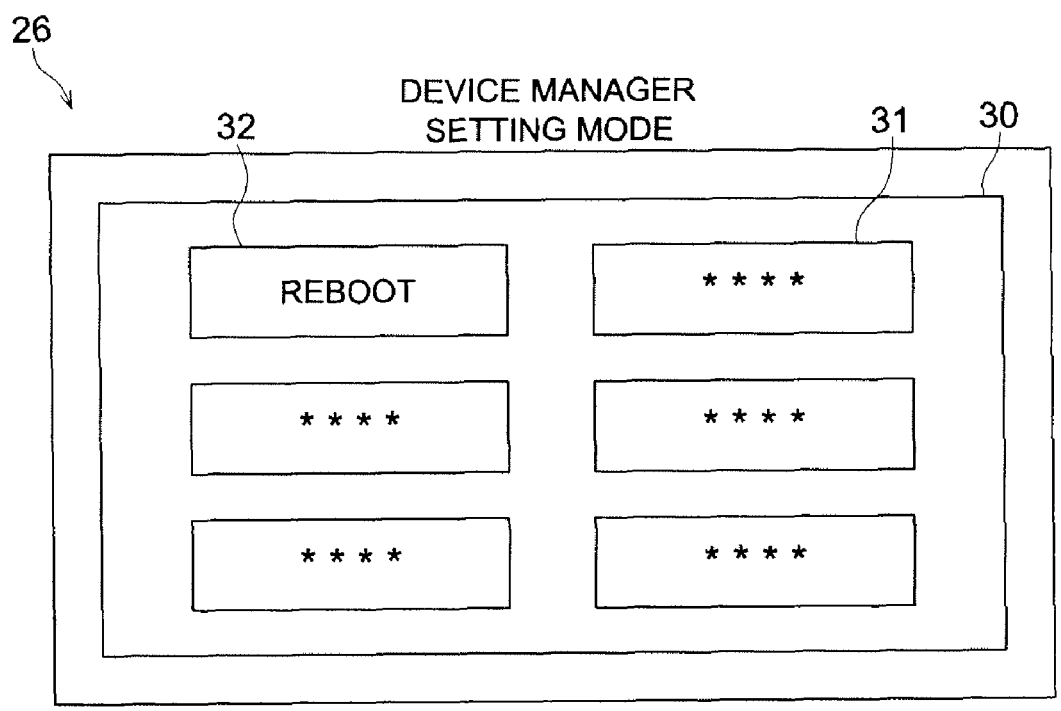
FIG. 2 shows the screen of device manager setting mode displayed in the operation panel of the information processing apparatus of the embodiment of the present invention.

FIG. 2 shows the screen of device manager setting mode (manager setting screen) displayed in the operation panel 26. In the device manager setting mode, setting button 31 for performing detailed setting of the information processing apparatus 10 and reboot button 32 are displayed at the screen section 30 of the operation panel 26. When the reboot button 32 is pressed reboot A is performed.

In addition, the manager password for entering the device manager setting mode is set for each manager and the device manager setting mode can only be entered when the password matches and reboot A is performed from the manager setting mode screen. In the case where the password does not match, because the device manager setting mode is not entered, reboot A cannot be performed.

Figure 3:
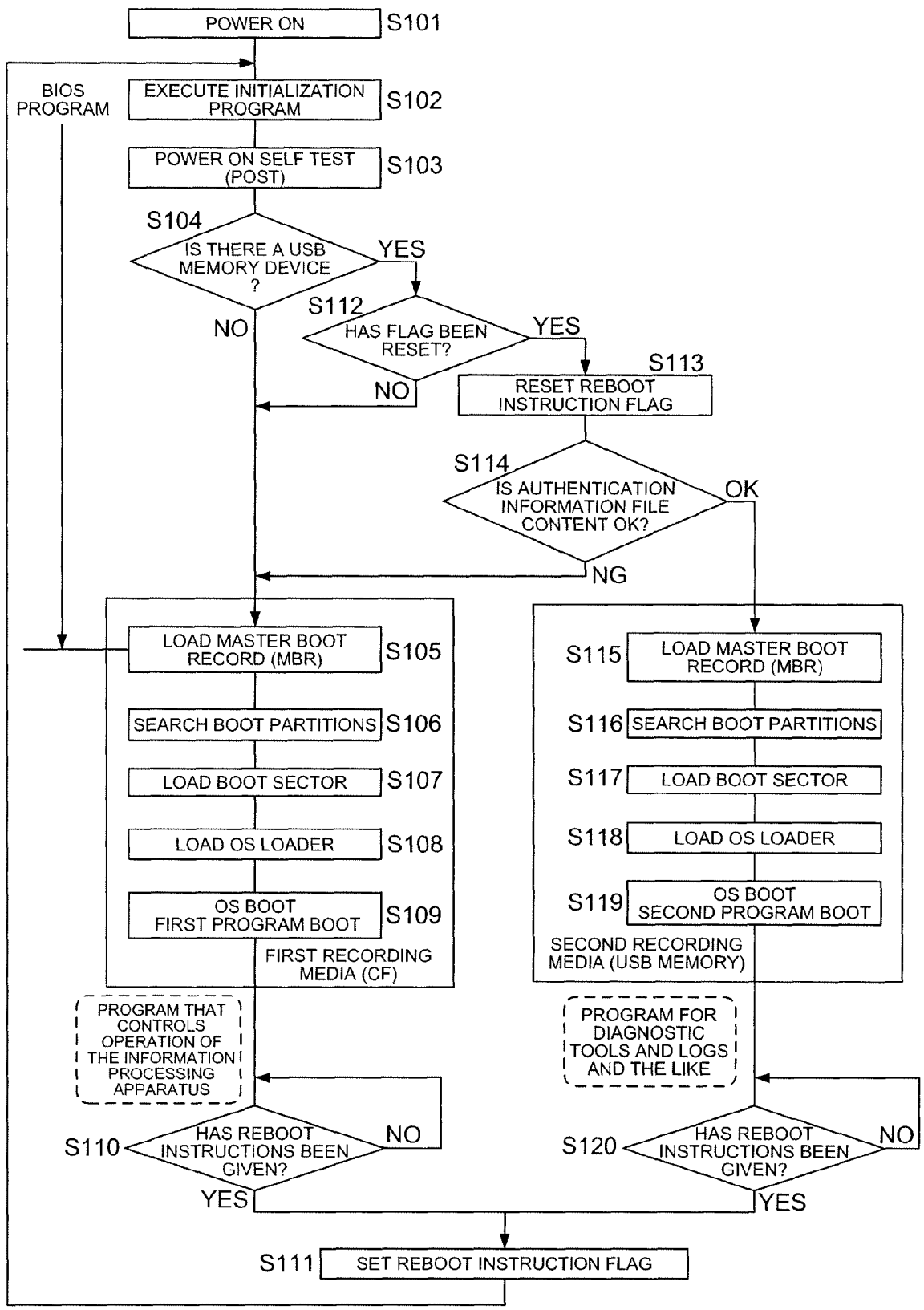
FIG. 3 is a flowchart showing operation at the time of booting of the information processing apparatus of the embodiment of the present invention.

FIG. 3 shows the flow of the process performed at the time of boot (power on) of the information processing apparatus 10. First, the overall flow of the booting process will be described and then flow of the processes depending on initial boot/reboot and whether or not there is an external device (second recording medium 25) will be described.

When the power for the information processing apparatus 10 is turned on (Step S101), the initialization program inside the BIOS program that is stored in BIOSROM 16 is called up and executed (Step S102) and Power On Self Test (POST) such as video card initialization, memory check and device initialization are performed (Step S103).

When Power On Self Test is complete, a determination which includes the check on the state and the confirmation is made as to whether the second recording medium 25 (USB memory) is connected to the connection section 18 (YES/NO) (Step S104). If it is connected (Yes in Step S104), the procedure goes to Step S112. In the case where it is not connected, (No in Step S104), because the second recording medium 25 which is set to boot drive priority level 1 in the BIOS setting is detected, booting is performed from the first recording medium 17 which is set at the next priority level.

The first recording medium 17 is installed inside of the information processing apparatus 10 and cannot be removed by a user or the like, and also because the BIOS setup menu is not open to the user, it is not possible for the user to access programs and the like stored in the first recording medium 17. In this manner, because security of the first recording medium 17 is ensured, even if authentication of the first recording medium 17 is not performed, this is not problematic. Thus, in the case where booting is done from the first recording medium 17 processing can proceed without authentication of the first recording medium 17.

In booting from the first recording medium 17, the master boot record (MBR) for the first recording medium 17 is loaded on the system memory 12 and control is transferred to the boot programs written in the system memory 12 (Step S105).

The booting program searches the boot partition in the first recording medium 17 (Step S106) and the head position of the boot partition is searched for from the partition table and the boot sector is loaded on the system memory 12 (Step S107).

The program recorded in the boot sector loads the OS loader onto the system memory 12 and control is transferred to the OS of the first recording medium 17 (Step S108). The OS of the first recording medium 17 then boots the first program which controls the operation of the information processing apparatus 10 (Step S109) and the information processing apparatus 10 enters the normal operation mode. In the information processing apparatus 10 which is digital multifunction peripheral such as that of this embodiment, the copy function, scanner function, printer function, facsimile function can be operated in the normal operation mode.

In normal operation, in the case where instruction for reboot A is given (Yes in Step S110), or in other words, in the case where a user manager or service provider operates the operation panel 26 and inputs the manager password, the device manager setting mode starts up, and in the case where the reboot button 32 (see FIG. 2) is pressed, a reboot instruction flag for holding the reboot A instruction status is set (Step S111) and the procedure returns to Step S102 and reboot A begins. In the case where no reboot A instruction is given (No in Step S110), normal operation continues.

The reboot instruction flag used in this process indicates whether or not reboot instructions have been input (whether the reboot button 32 has been pressed). Flag off indicates that reboot A instruction has not been input (initial value) while flag on indicates that reboot A instruction has been input. This reboot instruction flag is instruction input information which shows a prescribed instruction (instruction to boot the second program stored in the second recording medium 25) has been input from the operation panel 26 which is the instruction input section. In addition, this flag is stored in a memory region that is not initialized by the memory check and device initialization (Step S103) performed after booting (power on) of the information processing apparatus 10.

In Step S104, a determination is made that the second recording medium 25 is connected to the connection section 18 (Yes in Step S104) and in the case where the procedure moves to Step S112 and a determination is made as to whether the reboot instruction flag is set (Step S112).

In the case where the reboot instruction flag is not set (No in Step S112), the procedure moves to Step S105 and booting is performed from the first recording medium 17. In the case where the reboot instruction flag is set (Yes in Step S112), the reboot instruction flag is reset (Step S113) and the content of the specific cancel key file (authentication information file) stored in the second recording medium 25 is checked (Step S114). To be more specific, the fixed sector in which the specific cancel key file of the second recording medium 25 is stored is read and specific cancel key (such as "xyz20060925") is retrieved and a determination is made as to whether the second recording medium 25 booting was permitted.

For example, if a second recording medium 25 which has no specific cancel key file, or which has a non-specific cancel key file which stores a non-specific cancel key that is different from the specific cancel key is connected and the information processing apparatus 10 is booted, the second recording medium 25 in which the boot drive is set to priority level 1 in the BIOS setting is detected, but in content confirmation for the specific cancel key file (Step S114), the specific cancel key is not authenticated and booting from that second recording medium 25 is not permitted. In the case where booting from the second recording medium 25 is not permitted (NG in Step S114), the procedure moves to Step S105 and booting is performed from the first recording medium 17.

If a determination is made that the content of the specific cancel key file is correct (specific cancel key is authenticated) (OK in Step S114), booting from the second recording medium 25 is permitted.

The BIOS program that permitted booting from the second recording medium 25 loads the master boot record (MBR) for the second recording medium 25 on the system memory 12 and transfers control to the boot program written thereon (Step S115).

The boot program searches the boot partition in the second recording medium 25 (Step S116) and the head position of the boot partition is searched from the partition table and the boot sector is loaded on the system memory 12 (Step S117).

The program recorded in the boot sector loads the OS loader on the system memory 12 and transfers control to the OS of the second recording medium 25 (Step S118). The OS of the second recording medium 25 then boots the second program or in other words, commercially available diagnostic tools and log collection program for information processing apparatus 10 and program for automatically updating of programs stored in the first recording medium 17 (Step S119).

As a result, the user manager or customer service provider can perform automatic diagnosis and log collection for the information processing apparatus 10 and automatic update of the programs stored in the first recording medium 17.

During the operations done by the second program, in the case where the reboot A instruction is given as in the case in Step S110 (Yes in Step S120), the reboot instruction flag is set (Step S111) and the procedure returns to Step S102 and reboot A begins. In the case where there is no instruction for reboot A (No in Step S120), operation by the second program continues.

The overall flow of the booting process was described above and next, the flow of the initial boot/reboot and the four types of processes depending on whether or not there is an external device (second recording medium 25) will be described.

(1) Initial Booting when there is an External Device (Normal Boot)

When the second recording medium 25 is connected to the information processing apparatus 10 and the power is turned on, (Step S101-), even if the second recording medium 25 is connected (Yes in Step S104), because the reboot instruction flag is not set (No in Step S112), authentication of the second recording medium 25 is not performed and booting is performed from the first recording medium 17 (Step S105-S109).

(2) Reboot A when there is an External Device (Reboot Instructed by User)

When the second recording medium 25 is connected to the information processing apparatus 10 and the device manager setting mode is entered, when reboot A instruction is given, (Yes in Step S110), the reboot instruction flag is set (Step S111) and reboot A is performed (Step S102-). At the time of this rebooting, connection of the second recording medium 25 is confirmed (Yes in Step S104) and setting of the reboot instruction flag is confirmed (Yes in Step S112), and after resetting the reboot instruction flag (Yes in Step S113), authentication of the second recording medium 25 is performed (Step S114). In the case where it is authenticated (OK in Step S114), booting from the second recording medium 25 is performed (Step S115-S119), and in the case where it is not authenticated, booting from the first recording medium 17 is performed.

(3) Reboot B when there is an External Device (Return to Normal Operation Mode from Energy Saving Mode)

When reboot B in which the normal operation mode is returned to from the energy saving mode (Step S102-), connection of the second recording medium 25 during reboot is confirmed (Yes in Step S104) and setting of the reboot instruction flag is not confirmed (No in Step S112), and thus authentication of the second recording medium 25 is not performed and booting is done from the first recording medium 17.

(4) Initial Boot and Reboot a when there is No External Device (Reboot Instructed by User)

When the second recording medium 25 is not connected to the information processing apparatus 10 and the power is turned on, (Step S101-), because connection of the second recording medium 25 was not confirmed (No in Step S104) booting is performed from the first recording medium 17 and the normal operation mode is entered. In the normal operation mode, if the device manager setting mode is entered, and reboot A is instructed (Yes in Step S110) and reboot A is performed (Step S102-). At the time of this reboot also, because connection of the second recording medium 25 is not confirmed (No in Step S104), booting up is done from the first recording medium 17 and the normal operation mode is entered once again.

In this manner, in the information processing apparatus 10 of the present embodiment, in order to boot from the second recording medium 25 which is an external device, the user must input instructions (press the reboot button 32 using the operation panel 26) and even if the second recording medium 25 is connected to the apparatus, if that input operation is not performed, booting will occur from the first recording medium 17 which is an internal device. For example, in the case where after booting from the second recording medium 25 or the like, the user wishes to use the apparatus in normal operation mode using the first program, even if the user forgets to detach the second recording medium 25 from the apparatus and then boots up, the first program boots up and normal operation of the device becomes possible. As a result, even in the case where the user forgets to detach the second recording medium 25 that is externally connected to the apparatus, booting from the second recording medium 25 that is against the will of the user can be prevented.

In addition, because the fact that instruction for booting from the second recording medium 25 is input (by pressing the reboot button 32) is saved by a flag that is stored in a prescribed memory region (reboot instruction flag), when rebooting the apparatus, booting from the second recording medium 25 can be performed based on the stored flag (the flag on state).

Also, during BIOS booting, when connection of the second recording medium 25 to the apparatus and input of prescribed instructions from operation panel 26 is confirmed based on the flag, the flag is reset (to the flag off state). Subsequently, even if the second recording medium 25 is connected to the apparatus, as long as instructions are not input from the operation panel 26, when booting the apparatus, booting occurs from the first recording medium 17 from the next time onwards.

In this manner, the boot frequency for the apparatus to be made valid is set and automatically reset for the stored flag on status, or in other words, the booting instructions for the second recording medium 25, and so, if for example the "flag on" state that has been stored once is made valid each time the apparatus boots, booting of the apparatus that occurs from the next time onwards never occurs from the second recording medium 25. (In the case of the present embodiment, if the flag on state is confirmed once the flag is reset and becomes invalid.)

In the prior art, when the user connected/disconnected an external device to the apparatus, booting/cancellation from the external device occurred. For this reason, after connection of the external device, as long as the user does not disconnect, or in other words, as long as an operation for cancelling booting from the external device is not performed, booting from the external device will continue. In response to this, in the information processing apparatus 10 of the present embodiment, booting from the second recording medium 25 which is the external device require two conditions which are connection to the apparatus and instruction (input operation) to reboot, and one condition (instruction to reboot) can become invalid automatically as described above. As a result, even if the user does not perform an operation to cancel the booting from the second recording medium 25, or if the user forgets, booting from the second recording medium 25 will be automatically cancelled and thus booting from the second recording medium 25 against the will of the user caused by forgetting to cancel connection is prevented.

In addition, in the case of booting from the second recording medium 25, because the apparatus is re-booted when the reboot button 32 is pressed, it is not necessary to separately perform the input operation for instructing booting from the second recording medium 25 and the rebooting operation, and thus the operation is simplified.

Also, by authenticating the second recording medium 25 during BIOS booting, permission is given only for booting of the second program stored in the authenticated second recording medium 25, and booting for all other programs is not permitted. As a result, booting of a malicious program stored in the second recording medium 25, for example, would be prevented and the programs in the apparatus would not be accessed. Thus, security of the device is ensured while at the BIOS level, the boot drive can be switched to the second recording medium 25 which is an external device.

Furthermore, even if the operation of changing the priority level of the boot drive at the BIOS setup menu is not performed, during BIOS booting, the boot drive is switched to the second recording medium 25 and the programs stored in the second recording medium 25 are booted at the BIOS level (booted independently of the OS loaded in the information processing apparatus 10), and thus a program with a high degree of freedom that is does not depend on the apparatus OS is formed.

That is to say, in the case where the boot drive is switched to the second recording medium 25 which is an external device, during BIOS booting, the program on the second recording medium 25 (the second program) may be used for the independent OS stored in the second recording medium 25 and in special programs without OS, thereby increasing the degree of freedom of the program. In addition, because it does not depend on the apparatus OS and program (first program), there is no need to change the apparatus OS and the like to match the program of the second recording medium 25, and it is sufficient to change only the programs loaded in the second recording medium 25, and thus if a personal computer or the like is available, the program loaded in the second recording medium 25 can be easily changed.

In the case of booting from the first recording medium 17 (compact flash) provided inside the information processing apparatus 10, authentication of the first recording medium 17 is not performed and thus the booting process is simplified.

An embodiment of the present invention has been described above with reference to the drawings, but the specific configuration is not to be limited by this embodiment and various modifications and additions may be included in the present invention provided that they do not depart from the general spirit of the invention.

For example, in the booting process of the embodiment, boot drive is determined in the BIOS settings by searching in order from the boot drive with highest priority level, but rather than searching the boot drives in priority order, all the boot drives loaded in (connected to) the information processing apparatus may be searched and then second recording medium in which prescribed authentication information is successfully authenticated is connected and this second recording medium is booted as the boot drive.

In addition, in this embodiment, the first recording medium formed as the first recording medium 17 is not limited to a compact flash, and various memory cards of different standards or memory devices or ROM provided inside the information processing apparatus 10 may be used. The second recording medium which is the second recording medium 25 in the embodiment is not to be limited to USB memory, and for example removable disks such as flexible disk cartridge or MO (magneto Optical disk) or various memory cards may be used.

In addition, if non-volatile memory and the like is used as the memory device for storing the reboot instruction flag status, even if the power of the apparatus is turned off, the memory content (flag status) can be saved and thus, in addition to rebooting described in this embodiment in which external booting is done without turning off the power source (reboot A), even in the case where apparatus power in turned on from the power off state, booting from the second recording medium 25 can occur.

Also in this embodiment, instruction for booting from the second recording medium 25 and rebooting are performed by using the single input operation in which the reboot button 32 of the operation panel is pressed in the device manager setting mode, but this instruction and the rebooting operation may be performed separately. For example, a button for assigning a boot drive to an external device may be displayed in the operation panel 26 and by pressing the button, booting instruction from the external device is received (flag on). Subsequently, status setting for the device is performed in the device manager setting mode, or alternatively the apparatus may be transferred to the normal operation mode and then operated. Also, the configuration may be such that an external device is connected to the apparatus and then the user presses the reboot button 32 at a suitably selected timing at which he/she wishes to boot from the external device, or when the power source for the device is turned on/off, the boot drive is switched to the external device and the instruction for booting from the external device is made invalid (flag off).

In addition, in this embodiment, authentication determination for the external device 25 (second recording medium 25) is performed during BIOS booting, but this invention may also be suitably applied to external devices that do not perform this type of authentication determination (that do not store the authentication information). That is to say, the invention may also be applied to a configuration in which if input of the reboot instruction can be confirmed, booting from the external device (second program booting) is done without authentication determination.

In addition, the present invention may be applied not only to digital multi-function devices, but also to other information processing devices such as personal computers and the like.

What is claimed is:

1. An information processing apparatus comprising:
   a first recording medium which stores a first program;
   a connection section which is capable of connecting to a second recording medium outside of the information processing apparatus;
   a BIOS by which a priority level of a boot drives is set that the second recording medium capable of connecting via the outside has priority level 1 and the first recording medium has priority level 2;
   an instruction input section to input, while the information processing apparatus is in an activated state, an instruction for booting a second program stored in the second recording medium that is connected to the connection section on booting of the BIOS; and
   a controller which, performs a check when booting of the BIOS, if the second recording medium is connected to the connection section and the instruction has been input from the instruction input section while the information processing apparatus is in an activated state; in case when a state that the second recording medium is connected to the connection section and the instruction has been input from the instruction input section is confirmed when booting of the BIOS, the control section boots the second program, and in case when the state is not confirmed when booting of the BIOS, the control section boots the first program.

2. The information processing apparatus of claim 1, wherein, in case when the instruction is input from the instruction input section, an instruction input information showing that the instruction has been input is memorized, and after confirming the state, the instruction input information is deleted.

3. The information processing apparatus of claim 1, wherein in case when the instruction is input from the instruction input section, the information processing apparatus is rebooted.

4. The information processing apparatus of claim 1, wherein on booting the BIOS, further an authentication of the second recording medium being connected to the connection section is tried, and only when the second recording medium is authenticated, booting of the second program is permitted.

5. The information processing apparatus of claim 1 wherein the first recording medium is an internal device, such as storage device and ROM, provided in the information processing apparatus, and the second recording medium is an external device such as USB memory.

6. The information processing apparatus of any one of claim 1, wherein the second program comprises a diagnostic tool program, a log collection program, and a program for automatically updating the first program.

7. The information processing apparatus of claim 4, wherein an authentication information of the second recording medium comprises at least one of a password and an authentication code.

8. A computer readable recording medium storing a program which causes an information processing apparatus, to set a priority level of boot drives in BIOS, wherein a second recording medium capable of connecting via the outside has priority level 1 and a first recording medium has priority level 2;

to check, when booting of the BIOS, if a connection section which is capable of connecting to the second recording medium outside of the information processing apparatus is connected to the second recording medium and an instruction for booting a second program stored in the second recording medium that is connected with the connection section on booting of the information processing apparatus is input from the instruction input section from which the instruction has been input in an activated state of the information processing apparatus;

to boot the second program in case when a state that the connection section is connected with the second recording medium and the instruction has been input is confirmed; and to boot a first program stored in the first recording medium in case when the state cannot be confirmed.

9. The computer readable recording medium of claim 8, wherein the program causes an information processing apparatus to memorize the instruction input information showing that the instruction has been input when the instruction is input from the instruction input section, and to delete the instruction input information after the state is confirmed.

10. The computer readable recording medium of claims 8, wherein the program causes an information processing apparatus to reboot in case when the instruction is input from the instruction input section.

11. The computer readable recording medium of claim 8, wherein the program causes an information processing apparatus further to by an authentication of the second recording medium being connected to the connection section on booting the BIOS, and to permit booting the second program only when the authentication is confirmed.

* * * * *